April 16, 1968     H. W. DEMLER, SR     3,378,282
TUBE COUPLING

Filed Dec. 30, 1965     11 Sheets-Sheet 1

INVENTOR.
HENRY W. DEMLER SR.

April 16, 1968 H. W. DEMLER, SR 3,378,282
TUBE COUPLING
Filed Dec. 30, 1965 11 Sheets-Sheet 6

INVENTOR.
HENRY WILLIAM DEMLER SR
BY
Curtis, Morris & Safford

INVENTOR
HENRY WILLIAM DEMLER SR
BY
Curtis, Morris & Safford

United States Patent Office 3,378,282
Patented Apr. 16, 1968

3,378,282
TUBE COUPLING
Henry William Demler, Sr., Lebanon, Pa., assignor to AMP Incorporated, Harrisburg, Pa.
Continuation-in-part of application Ser. No. 476,949, Aug. 3, 1965. This application Dec. 30, 1965, Ser. No. 517,747
15 Claims. (Cl. 285—174)

This application is a continuation-in-part of copending applications, Ser. No. 335,038, filed Jan. 2, 1964, Ser. No. 364,228, filed May 1, 1964, Ser. No. 387,623, filed Aug. 5, 1964, and Ser. No. 476,949, filed Aug. 3, 1965, which have been abandoned, and Ser. No. 427,010, filed Jan. 21, 1965.

This invention relates to tubular connection members.

In the field of conduit, tubular or pipe couplings, a variety of connection members have been used, such as, threaded nut members mating with threaded ends of a body member; soldering, gluing or welding ends of the conduit members to be coupled onto a tubular member of slightly less diameter or into a tubular member of slightly greater diameter; threading the ends of the conduit members to mate with the threaded portions of a coupling member; flaring one end of a conduit member and inserting the end of another conduit member therein in telescopic relationship; etc.

These connection members and types similar thereto involve a large amount of time and labor to apply them to the tubular members in addition to the fact that some of them are expensive.

It is, therefore, a primary object of the present invention to provide connection members which are easily applied to tubular members to interconnect same.

Another object of the present invention is the provision of connection members which are inexpensive and which, when applied to tubular members to interconnect them, provide a sealed connection capable of withstanding pressure.

An additional object of the present invention is to provide connection members which may be substantially transparent for observation and indication purposes, acts like a snubber curbing vibration and acts as an insulator.

A further additional object of the present invention is to provide a quick disconnect for the connection members.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration and principles thereof and the manner of applying them in practical use so that they may modify them in various forms, each as may be best suited to the conditions of a particular use.

Figures 1, 2, 3, 4, 5:
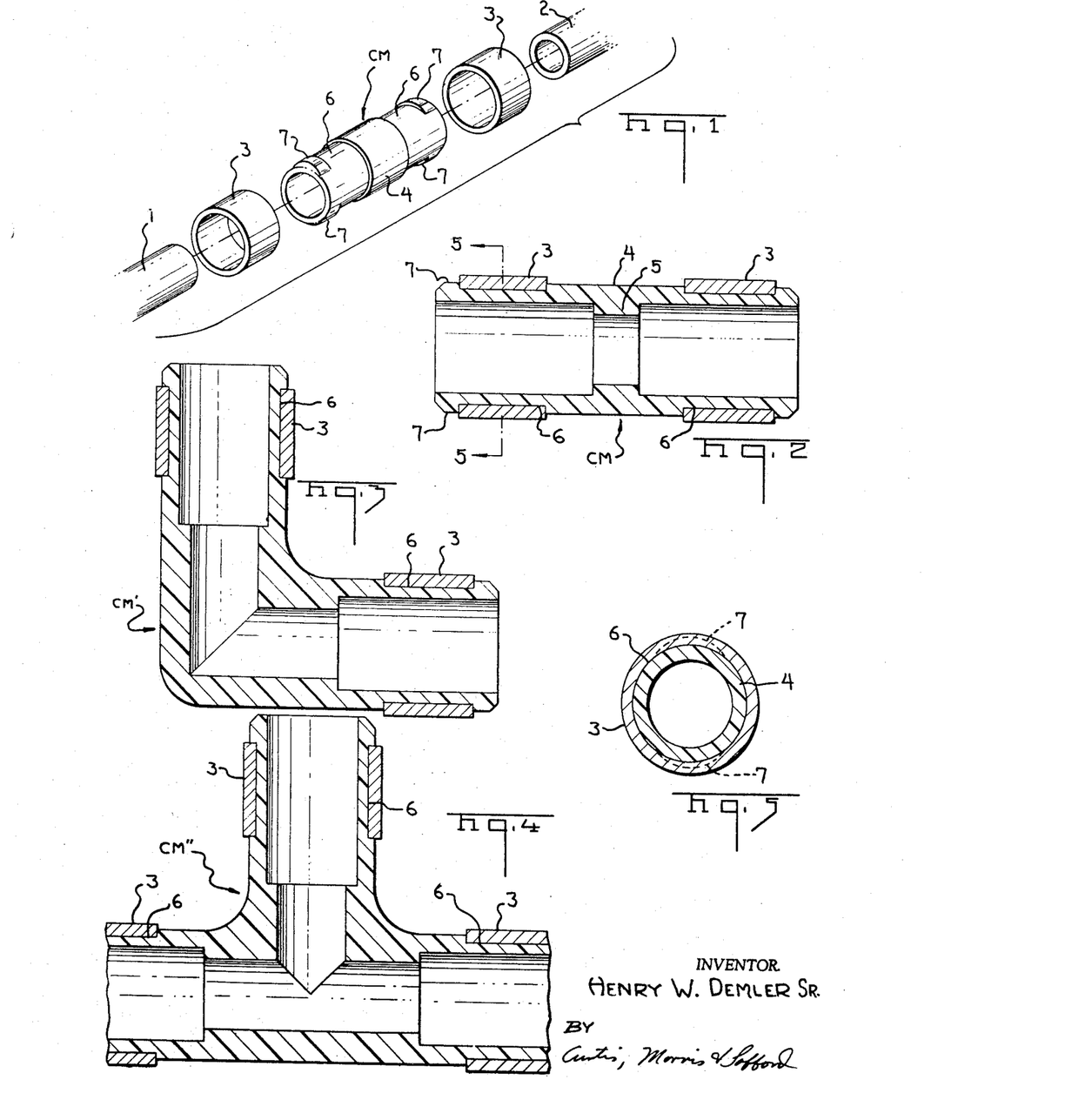
FIGURE 1 is an exploded perspective view of a connection member and tubular members to be interconnected thereby.
FIGURES 2, 3 and 4 are cross-sectional views of various types of connection members.
FIGURE 5 is a view taken along lines 5—5 of FIGURE 2.

In FIGURE 1, there is shown tubular members 1 and 2, a connection member CM and ferrule members 3. The tubular members 1, 2 are disposed within connection member CM which has ferrule members 3 thereon. The ferrule members are reduced in diameter. as described hereafter, to provide a strong and tightly sealed connection between tubular members 1 and 2 which may carry a fluid under pressure and which may be made of copper, aluminum, steel, plastic or other suitable material.

Connection member CM comprises a hollow tubular element 4 made from a suitable plastic material, such as, nylon, polypropylene, etc. The inside diameter of element 4 is slightly larger than that of tubular members 1 and 2 in order for them to be readily inserted within element 4. About midway within element 4 there is a shoulder 5 against which the ends of tubular members 1, 2 abut in order to limit their inner movement so that equal lengths thereof are engaged by element 4. Shoulder 5 has an opening therethrough corresponding to the inner diameter of tubular members 1 and 2.

Toward each end of the outer surface of element 4, there are annular grooves 6 in which ferrule members 3 are disposed. The outer end of each groove 6 does not have a projecting surface extending around the outer surface of element 4 but instead provides projections 7 (see FIGURE 5) which maintain ferrule members 3 on element 4 as well as enabling the ferrule members to be easily mounted on element 4. The outer ends of element 4 are preferably beveled to facilitate the placing of ferrule members 3 thereon.

Figures 21, 22:
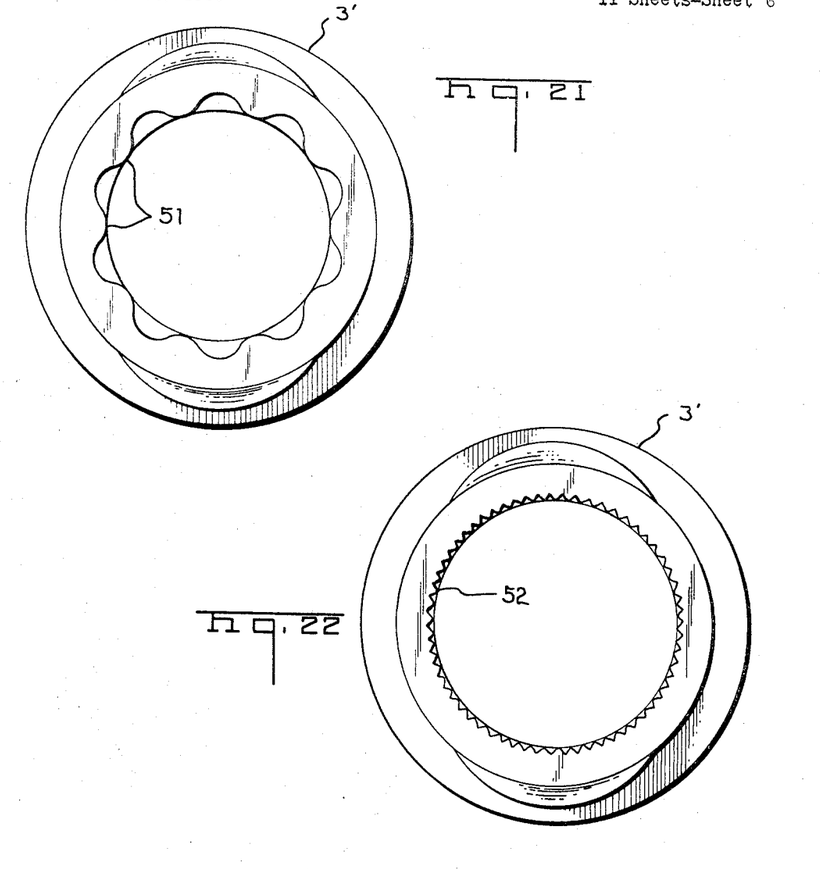
FIGURES 21 and 22 are end views of additional alternative embodiments of the connection member.

FIGURES 3 and 4 illustrate connection members similar to FIGURE 2 except that connection member CM' of FIGURE 3 is an elbow while connection member CM" of FIGURE 4 is a T-shaped member. It is obvious that the connection members can have other configurations which need not be expounded, and they can be made to accommodate various sizes of tubular members. Also, one part of the connection member may accommodate one size while another part thereof accommodates another size. In addition, the inner surface which engages the tubular members may be undulated 51 or serrated 52 as illustrated, respectively, in FIGURES 21 and 22. Another feature that may be essential depending upon the environment is to make the connection members of plastic material having sufficient transparent properties to provide indication or inspection of the coupled parts. Due to the elastic properties of the plastic material, the connection members act like a snubber thereby curbing vibration to prevent damage to instruments in a system. When using these connection members in connection with metal tubing, there is no metal-to-metal contact, thus, galvanic action is obviated. Since the coupling members are of plastic material, this prevents an electrical charge from travelling through the system. Ferrule members 3 may be made from soft copper, however, they can be made from any suitable material to accomplish the desired result.

Figures 6, 7, 8, 11A:
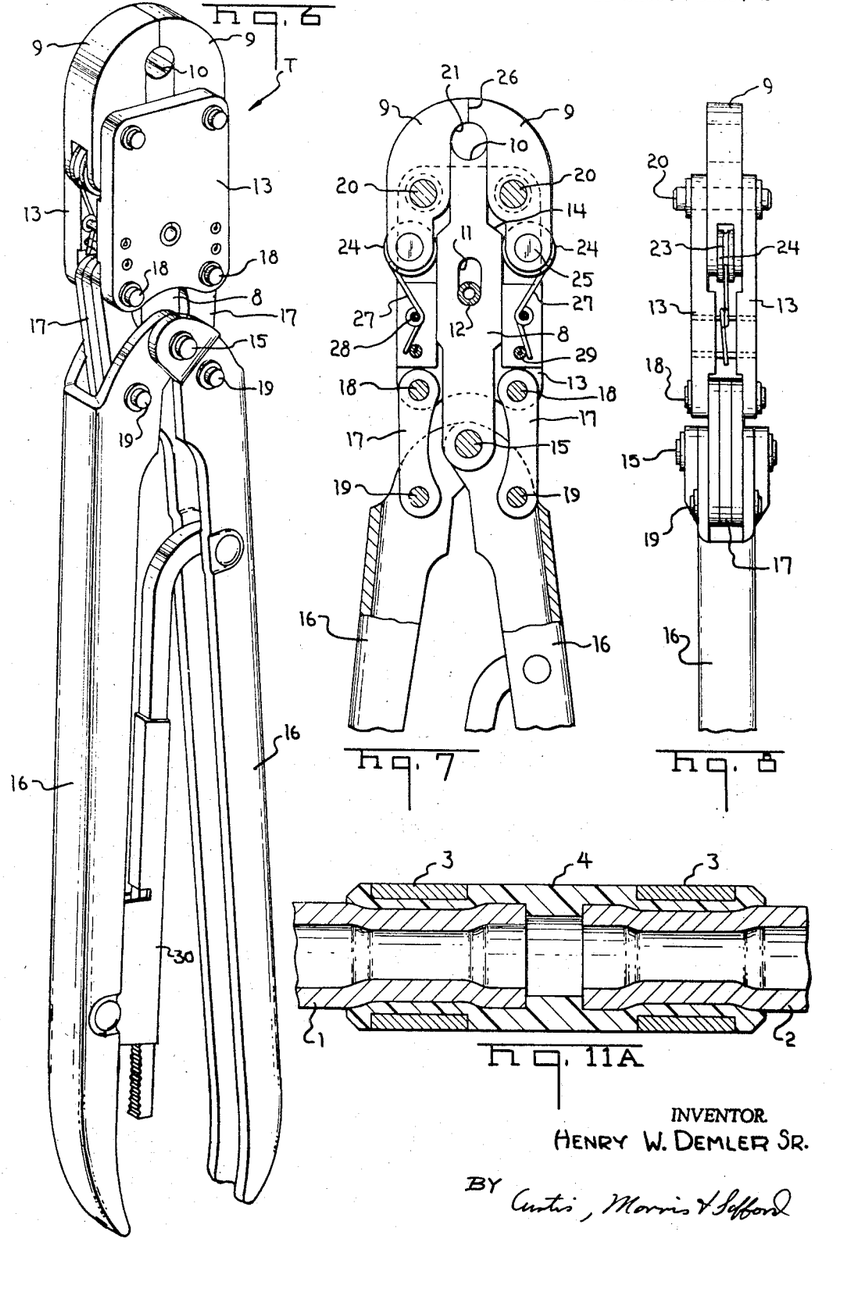
FIGURE 6 is a perspective view of a tool to apply the connection members onto the tubular members.
FIGURE 7 is a longitudinal cross-sectional view of the tool of FIGURE 6.
FIGURE 8 is an end or side view of FIGURE 7.
FIGURE 11a is a longitudinal cross-sectional view of a connection member coupled to tubular members.

FIGURES 6–8 illustrate a tool T for applying the connection members of FIGURES 2–4 onto the tubular members. Tool T comprises a sliding member 8 and jaw members 9. Sliding member 8 has a recessed section 10 having a predetermined radius.

Sliding member 8 has an oblong opening 11 through which passes a stop pin 12 which, in turn, is mounted in plate members 13. Sliding member 8 slides between plate members 13. A cam surface 14 extends outwardly from each edge of sliding member 8. The other end of sliding member 8 is pivotally connected by a pivot pin 15 to one end of handles 16. Linkage members 17 are pivotally connected at one end to a pivot pin 18 located on plate members 13 and at the other end by a pivot pin 19 on each handle 16 which is spaced from pivot pin 15.

Each jaw member 9 is pivotally connected to plate members 13 by a pivot pin 20 and has an arcuate section 21 which merges into a straight section 22. The radius of arcuate section 21 is the same as that of recessed section 10 of sliding member 8. The inner end of each jaw member 9 has a slot 23 in which a roller 24 is mounted by pin 25. The outer end of each jaw member 9 has an engaging surface 26 and these surfaces engage each other when rollers 24 are on top of cam surfaces 14 (See FIGURE 10).

Figures 9, 10, 11:
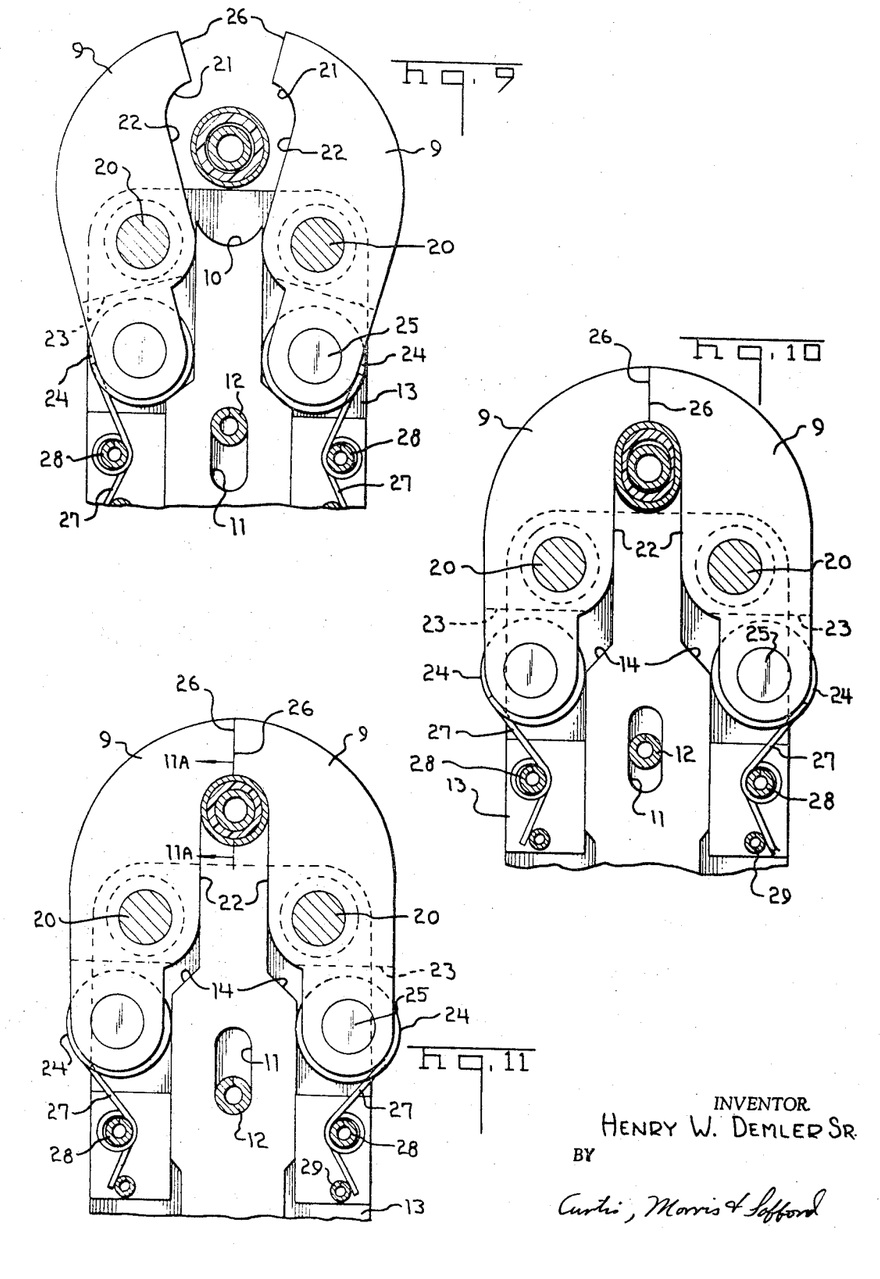
FIGURES 9, 10 and 11 are operating views of the tool of FIGURES 6–8.

The distance between straight sections 22, when engaging surfaces 26 are in engagement, is equal to twice the radius of recessed section 10 so that when sliding member 8 has been moved toward arcuate sections 21 to the extent of oblong opening 11 engaging stop pin 12, recessed section 10 and arcuate sections 21 define a circle as illustrated in FIGURES 7 and 11. Thus, the part of sliding member 8 between recessed section 10 and cam surfaces 14 is a rectangular part whose width is equal to the diameter of the circle formed by sliding member 8 and jaw members 9. When rollers 24 reach the top of cam surfaces 14 to cause engaging surfaces 26 to engage each other, the configuration defined by arcuate sections 21, straight sections 22 and recessed section 10 is oblong as shown in FIGURE 10.

Spring means 27 are mounted on pins 28 between plate members 13. One end of each spring means 27 engages one of jaw members 9 while the other end engages a pin 29 so that rollers 24 are normally biased against the edges of sliding member 8.

A ratchet assembly 30 may be pivotally connected to handles 16 and operates in such a manner that once the tool is operated to operate on the ferrule members of the connecion member, the handles cannot again be opened until the operation has been completed. This ratchet assembly is conventional, and a description thereof can be found in U.S. Patent No. 2,618,933.

In order to allow jaw members 9 to open further, sliding member 8 at the junction of cam surfaces 14 and the part containing recessed section 10 may be recessed.

*Operation*

Tubular members 1 and 2 are inserted within connection member CM which has ferrule members 3 in place thereon. Handles 16 of tool T are moved away from each other which cauess sliding member 8 to move rearwardly between plate members 13 until one end of oblong opening 11 engages stop pin 12 and rollers 24 to engage the edges of sliding member 8 forward of cam surfaces 14 causing jaw members 9 to pivot away from each other around pivot pins 20 whereby engaging surfaces 26 are spaced from each other to provide admittance between jaw members 9 as shown in FIGURE 9.

One of ferrule members 3 of the assembled tubular members and connection member is placed within the open jaw members, and handles 16 are moved toward each other. Sliding member 8 moves forwardly causing roller 24 to move along cam surfaces 14 to the top part thereof which brings engaging surfaces 26 together as shown in FIGURE 10. The ferrule member and the part of the connection member thereunder are formed into an oblong configuration within the area defined by sections 10, 21 and 22 of sliding member 8 and jaw members 9, respectively.

Upon further movement of handles 16 to their innermost position, the inner end of oblong opening 11 engages stop pin 12 and ferrule member 3 has been extruded to a round configuration as shown in FIGURE 11 by sections 10, 21 and 22 which now define a circle. The same operation is performed on the other ferrule member. The tool can be used by an unskilled operator with no danger of overcrimping and collapsing the tubular members or undercrimping them thereby causing a leak.

Thus, the ferrule members have been decreased in diameter from their original position to thereby cause the connection member to engage the tubular members and provide an effective and sealed interconnection therebetween which can withstand pressure as illustrated in FIGURE 11a. As can be discerned from FIGURE 11a, the inside diameter of the tubular members is reduced about ten percent in the area where the ferrule members have been placed and reduced in diameter.

If desired, an insert similar in configuration to a hollow rivet can be inserted within the ends of the tubular members prior to their being placed within the connection member in order to provide a back-up member to prevent the tubular members from being collapsed upon the ferrule members being reduced in diameter as described hereinabove. This is especially true if the tubular material is easily bent. The insert may have an easily discernible color, e.g., red.

Figures 12, 13, 14, 15:
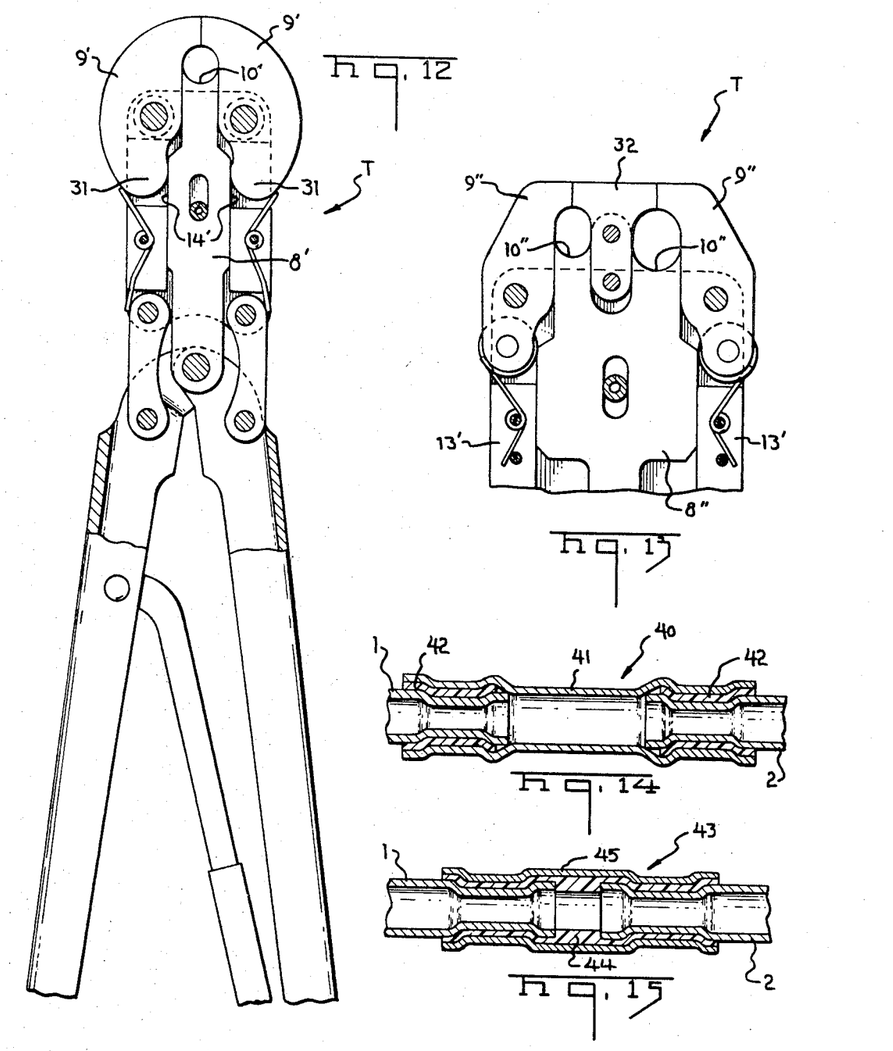
FIGURE 12 is a longitudinal cross-sectional view of an alternative embodiment of the tool.
FIGURE 13 is a longitudinal cross-sectional view of another embodiment of the tool.
FIGURES 14 and 15 are longitudinal cross-sectional views of alternative embodiments of connection members.

FIGURE 12 illustrates an embodiment of tool T and all of the parts are the same except that instead of rollers 24, the inner ends of jaw members 9' have cam sections 31 which engage cam surfaces 14' of sliding member 8'.

FIGURE 13 illustrates another embodiment of tool T and all the parts are the same as those of tool T except that plate members 13' have an extension 32 secured therebetween and each edge of which forms a stationary jaw member for movable jaw members 9''. One movable jaw member 9'' and its corresponding stationary jaw member are for operating on one size ferrule member while the other jaw member 9'' and its corresponding stationary jaw member operate on another size ferrule member. Sliding member 8'' also has recessed sections 10'' movable within the areas defined by jaw members 9'' and the stationary jaw members. Thus, there is provided a tool which can operate on more than one size ferrule member. While a tool has been disclosed to operate on one or two different size ferrule members, it is obvious that the tool could be extended to operate on more than two sizes.

If the ferrule members are long, it may be desirable to operate thereon at spaced sections therealong. This can be accomplished by providing recessed section 10, arcuate sections 21 and part of straight sections 22 with slots which are disposed in the same planes parallel to the longitudinal axis of the tool.

While the present invention has been directed to ferrule members on a connection member, it is possible to place the end of a tubular member telescopically within the end of another tubular member, such as, for example, a coaxial connector within the outer conductor of a coaxial cable, place a ferrule member thereover and use the above-mentioned tool to operate thereon to thereby interconnect the tubular members.

FIGURES 14 and 15 illustrate alternative embodiments of the connection members. In FIGURE 14 there is shown a connection member 40 including a hollow tubular member 41 made from metal, such as, copper, aluminum. Each end of member 41 is flared. A piece of plastic material 42 is disposed within each flared end and tubular members 1 and 2 are placed therewithin. The flared ends are then reduced in diameter with the tool described hereinabove thereby effecting an effective and seal connection.

Connection member 43 of FIGURE 15 is similar to the connection member of FIGURES 1, 2, and 11a except no grooves are provided in the outer surface of hollow plastic tubular member 44. A single ferrule member 45 extends over the entire outer surface of tubular member 44 to provide an assembled connection member. Tubular members 1 and 2 are disposed within the connection member, and over each tubular member 1 and 2 ferrule member 45 is reduced in diameter by the tool described herein to provide an effective and sealed connection. The connection members of FIGURES 14 and 15 are especially suitable where rodents or gnawing animals are present or where the environment is detrimental to connection members having the tubular plastic members exposed.

Figure 16:
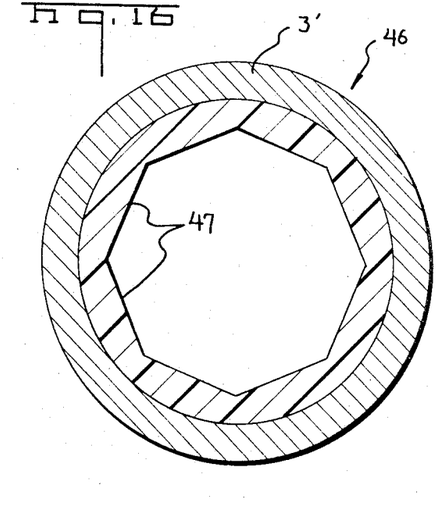
FIGURE 16 is a cross-sectional view similar to FIGURE 5 of another embodiment of the connection member.

FIGURES 16-19 illustrate further alternative embodiments of the connection members. In FIGURE 16 there is shown connection member 46 similar to the connection member of FIGURES 1, 2, and 11a except that the interior surface of each end has a noncontinuous surface and as illustrated, an octagonal configuration 47 having flat surfaces extending parallel to the axis of the connection member; however, it should be borne in mind that other similar configurations may be utilized, such as, for example, hexagonal, and that each of the flat surfaces may be slightly arcuate.

Figure 18:
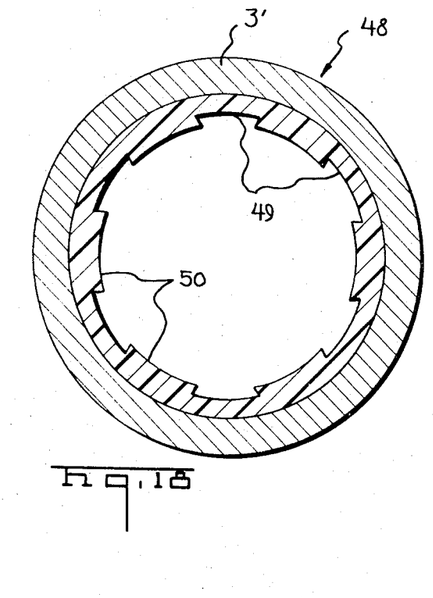
FIGURE 18 is a cross-sectional view similar to FIGURE 16 of a further embodiment of the connection member.

In FIGURE 18, there is shown a connection member 48 also similar to the connection member of FIGURES 1, 2 and 11a except that the interior surface of each end also has a noncontinuous surface and as illustrated a splined configuration having a plurality of equally-spaced depressions 49 with splines 50 therebetween. The sides of each depression are disposed at about 30° with respect to a plane passing normal to the axis of the connection member and through the center of the depression.

Figure 19:
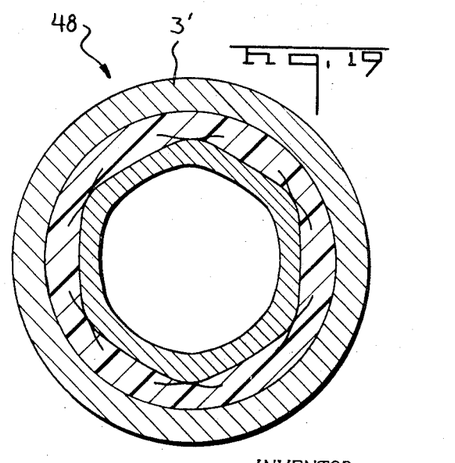
FIGURE 19 is a view similar to FIGURE 17 of the connection member of FIGURE 18 coupled to a tubular member.

Metal ferrule members 3' are disposed on the ends of the connection members of FIGURES 16 and 18 as in FIGURE 2 and the ends of the tubular conduit members are placed within the connection members. The ferrule members are then reduced in diameter with the tool described hereinabove thereby effecting an effective and sealed connection as illustrated in FIGURES 17 and 19.

Figure 20:
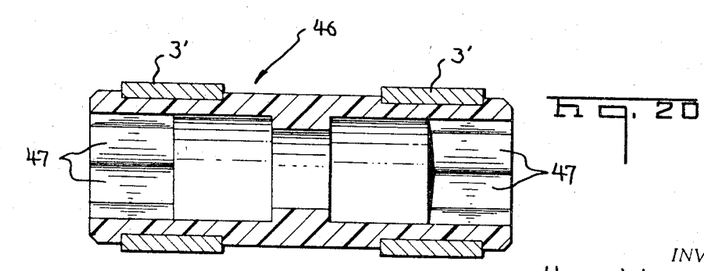
FIGURE 20 is a longitudinal cross-sectional view of FIGURE 16.

It should be pointed out that it is desirable that the length of the flat surfaces of FIGURE 16 and that of depressions 49 of FIGURE 18 extend from the end of the connection member to about the center of the crimped area underneath the ferrule member, as shown in FIGURE 20. This provides an effective seal between the connection member and the tubular member. The same would be true with respect to the embodiments of FIGURES 21 and 22. Thus, when the ferrule member is reduced in diameter, it is reduced in diameter simultaneously over the noncontinuous surface as well as the continuous surface.

Figure 17:
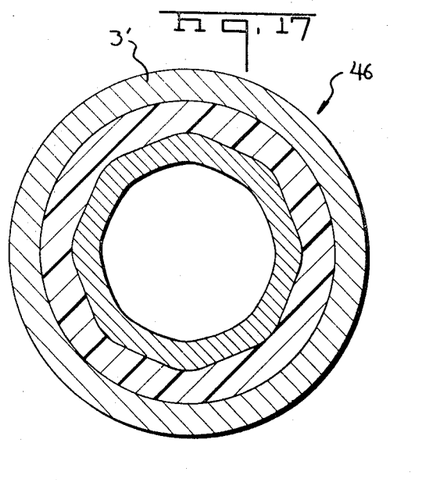
FIGURE 17 is a view similar to FIGURE 16 but with the connection member coupled to a tubular member.

As seen in FIGURE 17, the exterior surface of the tubular member in engagement with the octagonal configuration defines a discernible octagonal configuration. Upon inspection of FIGURE 19, the exterior surface of the tubular member in engagement with the splined configuration defines a discernible hexagonal configuration. With the connection members of FIGURES 16-19, the torque and tensile characteristics are measurably increased. The inner surfaces of the ends of the connection members of FIGURES 3 and 4 may, of course, be provided with the configuration shown in FIGURES 16-19.

Whereas, the inner surface of the ferrule members have been disclosed as being continuous, it may be noncontinuous in like manner as disclosed with respect to the noncontinuous inner surfaces of the connection members of FIGURES 16-22. Likewise, the outer surface of the ferrule members may be noncontinuous in that they may have a configuration similar to those disclosed in FIGURES 16-22, 30 and 33. If the ferrule members do have a configuration as mentioned hereinabove, the discontinuities will be imparted to the crimping area of the coupling member upon the ferrule members being crimped in order to achieve the deformation of the tubular members in a manner similar to that accomplished by the noncontinuous inner surface of the above-mentioned figures. The use of the noncontinuous ferrule members would, of course, be more desirable on the coupling members having the inner continuous surface.

Figures 23, 24, 25:
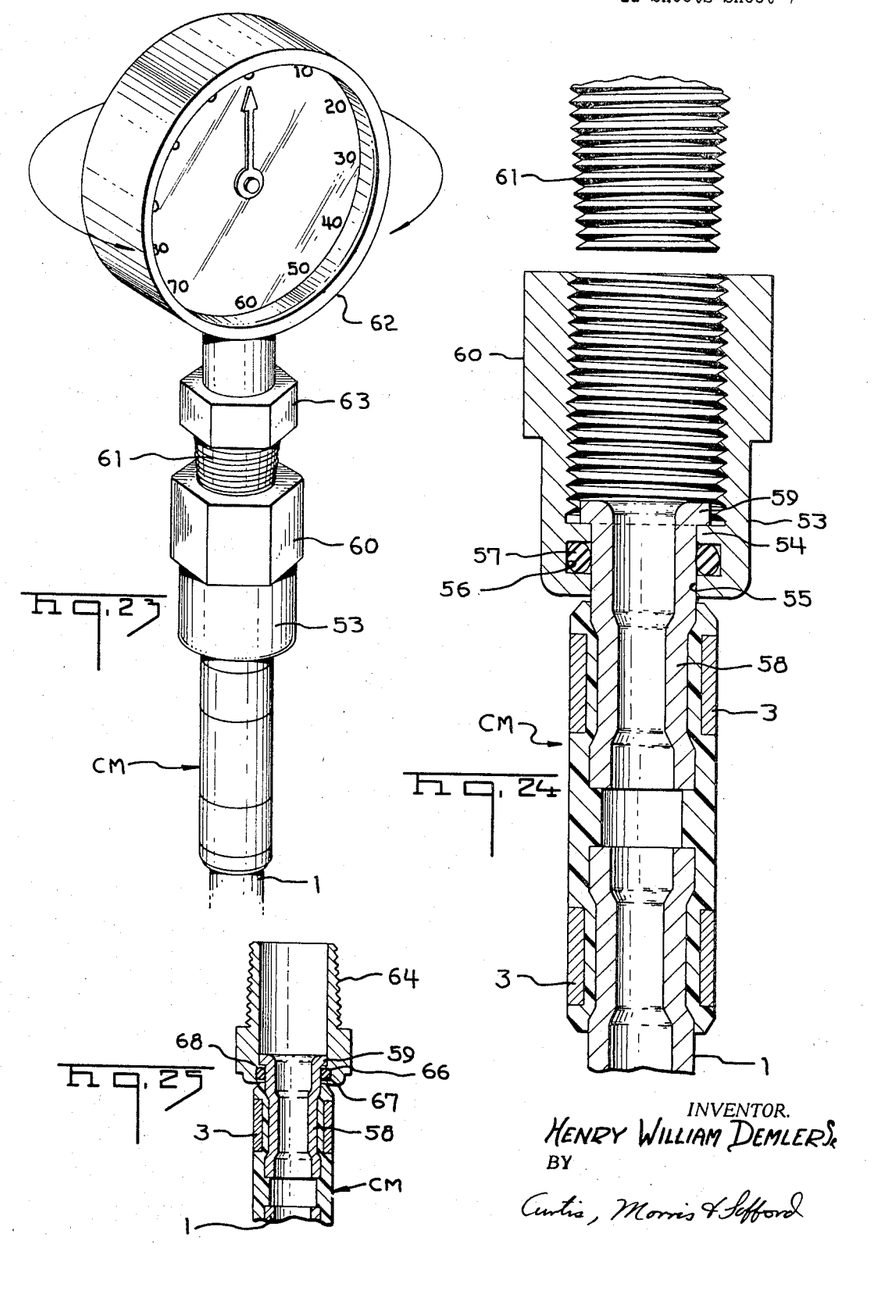
FIGURE 23 is a perspective view of an additional embodiment of the connection member.
FIGURE 24 is a cross-sectional view of FIGURE 23 with a part exploded therefrom.
FIGURE 25 is similar to FIGURE 24 but with a male threaded member.

FIGURES 23 and 24 illustrate an additional embodiment of the connection member. In this embodiment, a female threaded member 53 comprises a flange 54 located at the inner end of the threads. An opening 55 is disposed in member 53 and is coaxial therewith. An annular groove 56 is located in member 53 and is in communication with opening 55. An O-ring 57 of suitable material, such as, rubber, plastic, or the like, is disposed within groove 56.

A tubular insert member 58 of slightly less diameter than opening 55 is inserted therethrough and has a flange 59 which abuts against flange 54 to limit its axial movement. O-ring 57 bears against the exterior surface of insert member 58 to provide a seal between member 53 and insert member 58. Alternatively, an annular groove and O-ring may be disposed in insert member 58 at a location between flange 59 and the outer end of opening 55 instead of in opening 55.

As can be discerned, insert member 58 extends sufficiently beyond member 53 so that it can be placed within one end of a connection member CM described hereinabove and illustrated in FIGURES 2-4, 14, 15, 16, 18, 21 and 22 while one end of tubular member 1 or 2 is placed in the other end of the connection member. Ferrule members 3 are then reduced in diameter with the tool described hereinabove or the like thereby effecting an effective and sealed connection in the manner illustrated in FIGURES 11a, 14, 15, 17 and 19. With the connection member secured onto insert member 58, the insert member may or may not have any axial movement relative to member 53, and this depends on whether or not the end of the connection member engages or is spaced from the end of member 53. It is to be noted that member 53 is rotatable relative to insert member 58, and O-ring 57 maintains the effective seal at all times.

Section 60 of member 53 has an appropriate geometrical configuration (e.g., hexagonal) in order to be engaged by a wrench. A male threaded member 61 extends outwardly from an element 62, such as, for example, a gauge or any other type of element and has a section 63 similar to section 60 to enable the threads of member 61 to threadably engage the threads of member 53 in sealed relationship.

Thus, if element 62 is a gauge and is mounted on a panel, then it can be readily, effectively and sealingly connected to tubular member 1 via the assembly comprising member 53, insert member 58 and connection member CM. Alternatively, element 62 may be connected to tubular member 1 via the above-mentioned assembly and rotated to any desirable angular disposition.

FIGURE 25 illustrates the obverse of the embodiment of FIGURES 23 and 24 wherein a male threaded member 64 similar to member 61 has insert member 58 disposed in an opening 65 coaxial therewith, an annular groove 66 in communication with opening 65 and an O-ring 67 disposed in groove 66 and in sealing engagement with the exterior surface of insert member 58. Flange 59 of insert member 58 abuts against flange 68 of member 64 to limit the inner movement thereof. Of course, connection member CM is secured onto insert member 58 and tubular member 1 in the same manner described hereinabove.

While there has been disclosed threaded members having only one set of threads, members having more than one set of threads can be visualized, such as, for example, a male or female member having at least two sets of threads directed in different directions for engagement with elements, such as, for example, gauges, or the like, and an insert member disposed in another direction which is sealed and secured to the member in the manner disclosed hereinabove.

Figure 26:
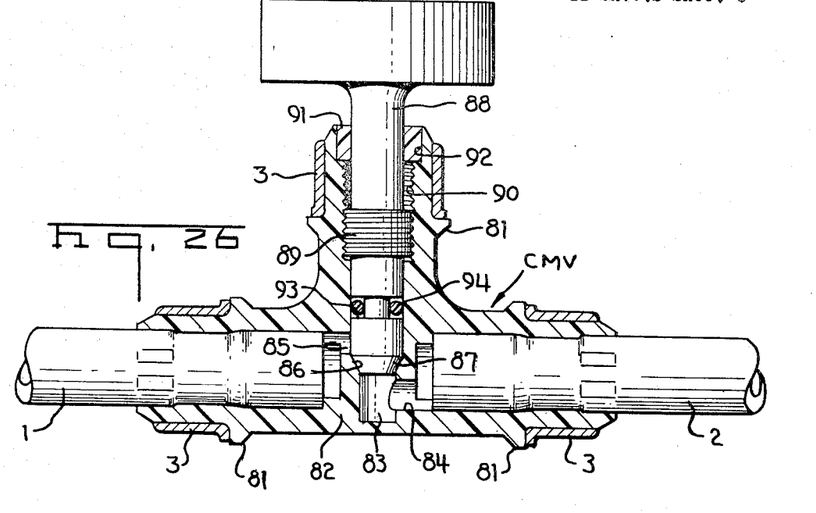
FIGURE 26 is a cross-sectional view of a still further embodiment of the connection member.
Figure 27:
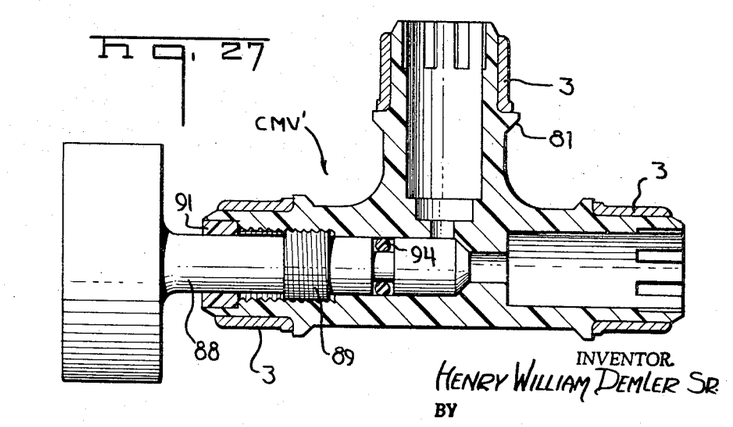
FIGURE 27 is a cross-sectional view of an embodiment of FIGURE 26.

FIGURES 26 and 27 illustrate a still further embodiment of the connection member wherein the connection member in the form of a T is used as a valve member. In this embodiment, tubular members 1 and 2 are disposed in two ends of connection member CMV and ferrule members 3 are crimped in the manner set forth hereinabove to secure the tubular members therein. Annular lips 81 are disposed on the connection member and these serve to locate the ferrule members at the proper crimping areas of the connection member as well as to aid in properly locating the ferrule members within the crimping area of the tool member.

Central section 82 has a central opening 83 in communication with tubular member 2 via opening 84 and in communication with tubular member 1 via opening 85. A valve seat 86 is disposed in central section 82 which is engageable by mating section 87 of valve stem 88 in order to close opening 85 to opening 83. Valve stem 88 includes a threaded section 89 engageable with an internally-threaded section 90 of the connection member in order to allow section 87 to move into engagement and out of engagement with valve seat 86. A retaining ring 91 surrounds valve stem 88 and is disposed in a recess 92 adjacent section 90. Retaining ring 91 is preferably made of metal but can, of course, be made from other suitable materials. Ferrule member 3 is crimped an appropriate amount to cause retaining ring 91 to hold valve stem 88 within the connection member. An annular recess 93 is disposed in valve stem 88 between sections 87 and 89 and an O-ring 94 is disposed in this recess in order to provide a seal therefor.

The connection member CMV' of FIGURE 27 is similar to that of FIGURE 26 except that the embodiment of FIGURE 26 is for connecting tubular members disposed in the same plane about 180° with respect to one another, whereas, the embodiment of FIGURE 27 is for connecting tubular members in the manner of an elbow member. Of course, other configurations can be visualized which are within the purview of valve design capability.

Valve stem 88 may be secured to the connection member by means of a threaded cap member which is threadably disposed onto the connection member. Other means for securing the valve stem within the connection member can, of course, be utilized.

Turning now to FIGURES 28 through 31, there is illustrated a connection member CM of the type disclosed above including ferrule members 3 disposed on crimpable sections, the ends of tubular members 1 and 2 are disposed within connection member CM and the ferrule members are reduced in diameter as described to provide a strong and tightly sealed connection between tubular members 1 and 2. As can be discerned, tubular member 1 is of smaller diameter than tubular member 2.

Figures 28, 29, 30, 31:
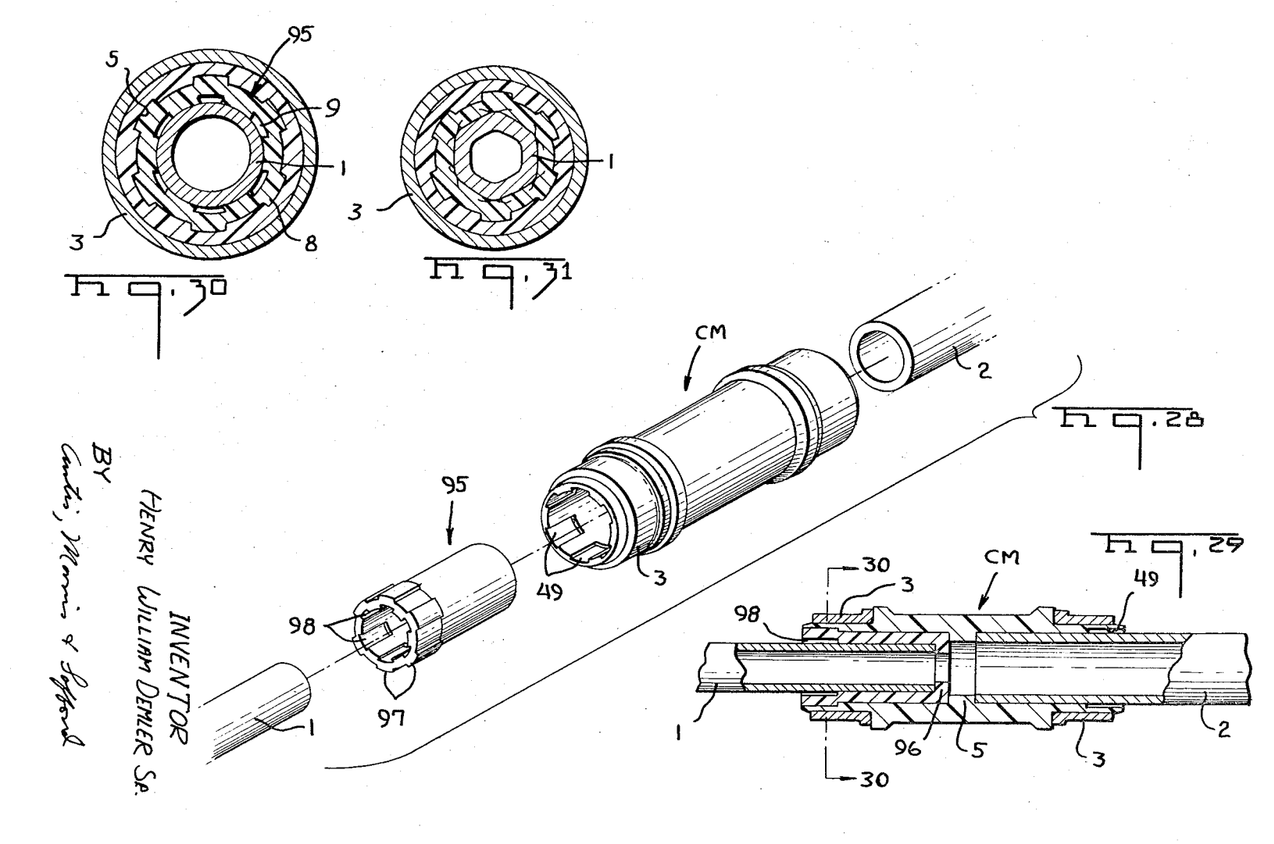
FIGURE 28 is a perspective exploded view of the connection member, insert member and tubular members to be interconnected thereby.
FIGURE 29 is a cross-sectional view of the parts of FIGURE 28 in an assembled condition prior to crimping.
FIGURE 30 is a view taken along lines 30—30 of FIGURE 29.
FIGURE 31 is a view similar to that of FIGURE 30 but showing the parts in a crimped condition.

A reducing member 95 is insertable within one end of connection member CM so as to accommodate the tubular member of smaller diameter. The interior surface of each end of the connection member has equally spaced depressions 49 which extend inwardly from the ends of the connection member to a distance about half the length of the crimpable sections, the remainder of the interior surfaces being continuous and having the same diameter to a centrally located shoulder 5 against which the ends of tubular members of the same size abut in order to limit their inner movement so that equal lengths thereof are disposed within the connection member.

Reducing member 95 is a hollow member which is preferably made of the same material as that of connection member CM. The inner end of the reducing member has an inwardly directed annular lip 96. Projections 97 are disposed on the exterior surface of the reducing member at the outer end thereof and these projections are matable with depressions 49 of the connection member while the remainder of reducing member 95 is mateable with the remainder of the interior surface of the connection member from depressions 49 to shoulder 5 as illustrated in FIGURE 2. The interior surface of reducing member 95 is similar to that of the interior surface of the connection member in that depressions 98 are disposed on the interior surface of reducing member 95 from the outer end, and the lengths thereof correspond to that of projections 97 and depressions 49. The remainder of the interior surface of reducing member 95 from depressions 98 to annular lip 96 is smooth and has the same diameter.

When it is desired to interconnect tubular members of the same diameter, the ends of the tubular members are disposed within connection member CM and ferrule members 3 are reduced in diameter causing the plastic material under the ferrule members to snugly and sealingly engage the tubular members to interconnect the tubular members and depressions 49 being six in number cause the tubular member in this area to assume a hexagonal configuration.

If, on the other hand, it is desired to interconnect a tubular member of larger diameter with a tubular member of smaller diameter, reducing member 95 is inserted in one end of connection members CM and tubular member 1 is inserted within reducing member 95 as illustrated in FIGURE 29 until the end of the tubular member engages annular lip 96 to limit the inner movement of tubular member 1. Ferrule member 3 is reduced in diameter in the same manner as described hereinabove, and depressions 98 cause tubular member 1 in this area to assume the configuration as illustrated in FIGURE 31 to form a protective sealed connection between the connection member and the tubular member.

Thus, connection member CM can be used to interconnect tubular members of the same diameter or to interconnect tubular members of different diameters by using the same connection member and merely inserting a reducing member within one end of the connection member. Such an embodiment precludes having to make connection members having one end provided with a diameter to receive one end of a tubular member conforming to this diameter while the other end has a diameter conforming to the diameter of a smaller tubular member for receipt therein. The reducing member of the present invention is made as a separate entity, for example, by molding and used as needed. The exterior surface of reducing member 95 will, of necessity, correspond to the interior surface of connection member CM but the interior surface of reducing member 95 can take any desirable form that will accomplish the desired purpose. Connection member CM may take other forms, such as for example, T, Y or cross configurations, and reducing members can be inserted into more than one end thereof.

Figures 32, 33, 34:
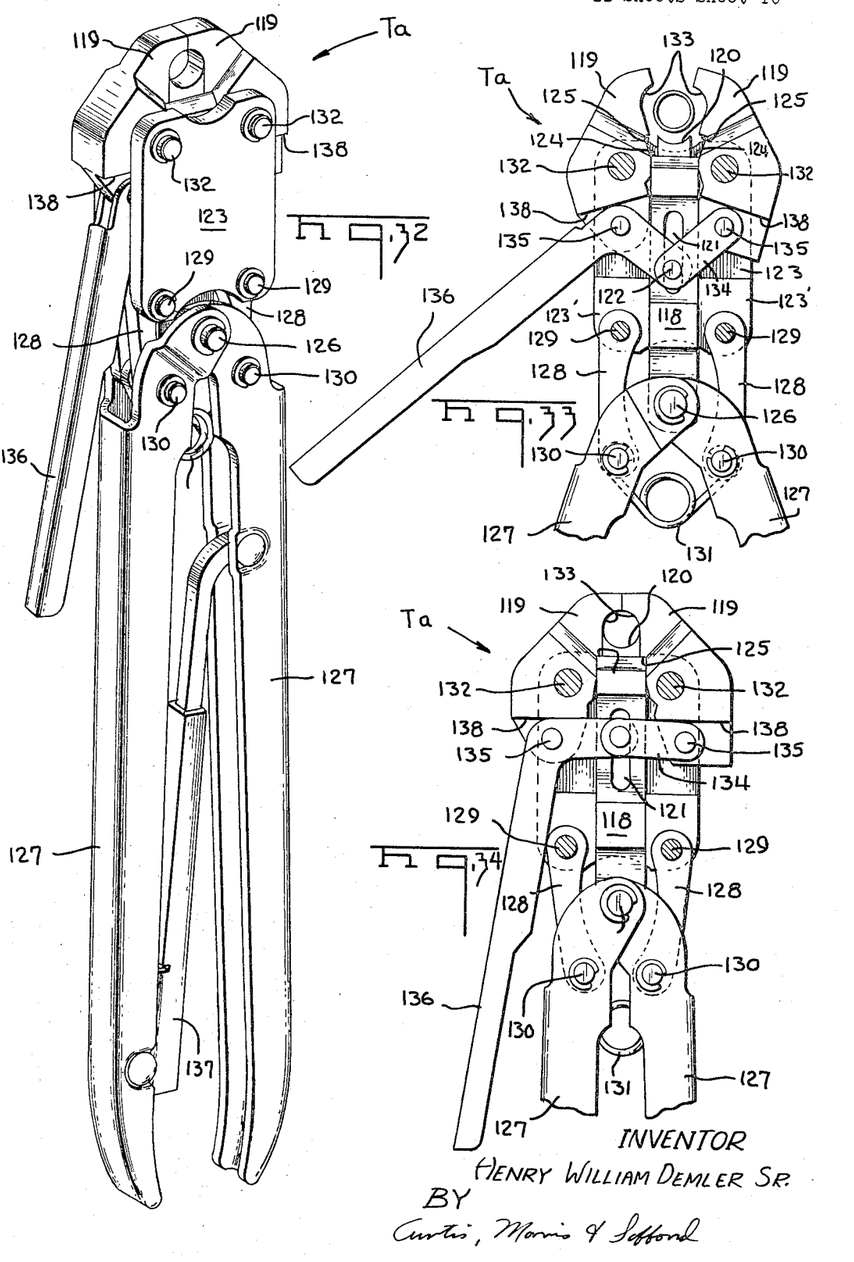
FIGURE 32 is a perspective view of the tool.
FIGURE 33 is a partial plan view of the tool with a plate member removed showing the tool in its inoperative position.
FIGURE 34 is a view similar to that of FIGURE 33 but showing the tool in its operative position.

Turning now to FIGURES 32 through 34, there is illustrated a tool to effect the crimping operation on the connection member. Tool Ta is similar in construction to the tool (described hereinabove) and comprises a sliding member 118 and jaw members 119. Sliding member 118 has an arcuate recess 120 having a predetermined radius. Sliding member 118 has an oblong opening 121 through which passes a pin member 122. Sliding member 118 slides between plate members 123 and is guided via extensions 123' thereon and jaw member 119. Shoulders 124 are located on each side of arcuate recess 120 and rearwardly thereof, and these shoulders are in alignment with stepped sections 125 in jaw members 119 when the jaw members are moved to their closed position. Shoulders 124 engage stepped sections 125 to limit the movement of sliding member 118 toward the closed ends of jaw members 119 as illustrated in FIGURE 34 thereby acting as a stop means. The other end of sliding member 118 is pivotally connected by pivot pin 126 to one end of handles 127. Linkage members 128 are pivotally connected at one end to pivot pins 129 located on plate members 123 and at the other end by pivot pins 130 on each handle 127 which are spaced from pivot pin 126. A torsion spring 131 has its ends affixed to pivot pins 130 and this spring functions to maintain handles 127 in an inoperative position.

Each jaw member 119 is pivotally connected to plate members 123 via a pivot pin 132 and includes an arcuate section 133 which merges into stepped section 125. The radius of arcuate section 133 is the same as that of arcuate recess 120 of sliding member 118. Pin 122 is guided in oblong slot 121 in order to keep the radii of arcuate sections 133 and arcuate recess 120 in alignment. The inner ends of jaw members 119 are pivotally connected together by means of a linkage system comprising a linking element 134 having one end connected to pin 135 while the other end is connected to pin 122 and an L-shaped lever element 136 having one end of the short leg pivotally connected to pin 122 and the other end of the short leg is pivotally connected to pin 135. The linkage assembly operates to open and close jaw members 119 without operating handles 127. A ratchet assembly 137 may be pivotally connected to handles 127 and operates in the same manner as that of U.S. Patent No. 2,618,933.

*Operation*

The tubular members are inserted within connection member CM which has ferrule members 3 in place thereon. Lever element 136 of tool Ta is moved outwardly from handles 127 causing jaw members 119 to be moved to an open position, as illustrated in FIGURE 33. Sliding member 118 is disposed in a downward position because of the spring action of spring 131. One of ferrule members 3 of the assembled tubular members and connection member is placed within the open jaw members, and lever element 136 is moved to an inner position, as illustrated in FIGURE 34, causing the jaw members to engage each other and in forming the ferrule member from a circular configuration to an oblong configuration (see FIGURE 10). Jaw members 119 are maintained in the position illustrated in FIGURE 34, because pin 122 has been moved to an off-center position and linking element 134 and the small leg of lever element 136 are in engagement with shoulders 138 on jaw members 119. Handles 127 are then moved toward each other causing sliding member 118 to move forwardly; and, after handles 127 have been moved to their innermost position, arcuate recess 120 is in a position relative to arcuate sections 133 of jaw members 119 so as to define a circular configuration thereby causing ferrule member 3 to be reduced in diameter to a round configuration via an extruding operation, as illustrated in FIGURES 11, 11A, 14, 15, 17, 19, 24, 25 and 31. After the crimping operation has been performed, handles 127 return to their inoperative position via spring 131, and lever element 136 is moved to an outer position, as illustrated in FIGURE 33, causing jaw members 119 to be moved to an open position so that the crimped connection member can be removed from the tool. The same operation is performed on the other ferrule member to complete the interconnection between the tubular members and the connection members. The tool can be used by an unskilled operator with no danger of over-crimping and collapsing the tubular members or under-crimping them thereby causing a leak.

Thus, the ferrule members have been decreased in diameter from their original position to thereby cause the connection member to engage the tubular members and provide an effective and sealed interconnection there-between which can withstand pressure.

As can be discerned, there has been disclosed a connection member to interconnect tubular or conduit members wherein a reducing member is insertable within one end of the connection member so that tubular members of different sizes can be interconnected together in a positive and sealed manner and tool means to apply these members thereon.

Turning now to FIGURES 35 through 38, there is illustrated an in-line disconnect coupling member 140 comprising a first hollow section 141, second hollow section 142, third hollow section 143, spring 144 and a sealing plunger 145. Outer ends of sections 141 and 143 have ferrule members 3 disposed on stepped sections and the area underneath these ferrule members is defined as a crimping area. From the ends to about midway of the crimping area, the inner surfaces of sections 141 and 143 preferably have a non-continuous configuration similar to that disclosed in FIGURE 18 including depressions 49 and splines 50 in order to deform a tubular member when disposed within sections 141 and 143 into a hexagonal configuration as illustrated in FIGURE 19 upon the ferrule members being crimped. From the non-continuous surface of section 141, bore 146 is continuous to an annular shoulder 147 having an opening 148 extending therethrough. Internal threads 149 are located in bore 150 at the outer end thereof.

Figures 35, 36, 37, 38, 39:
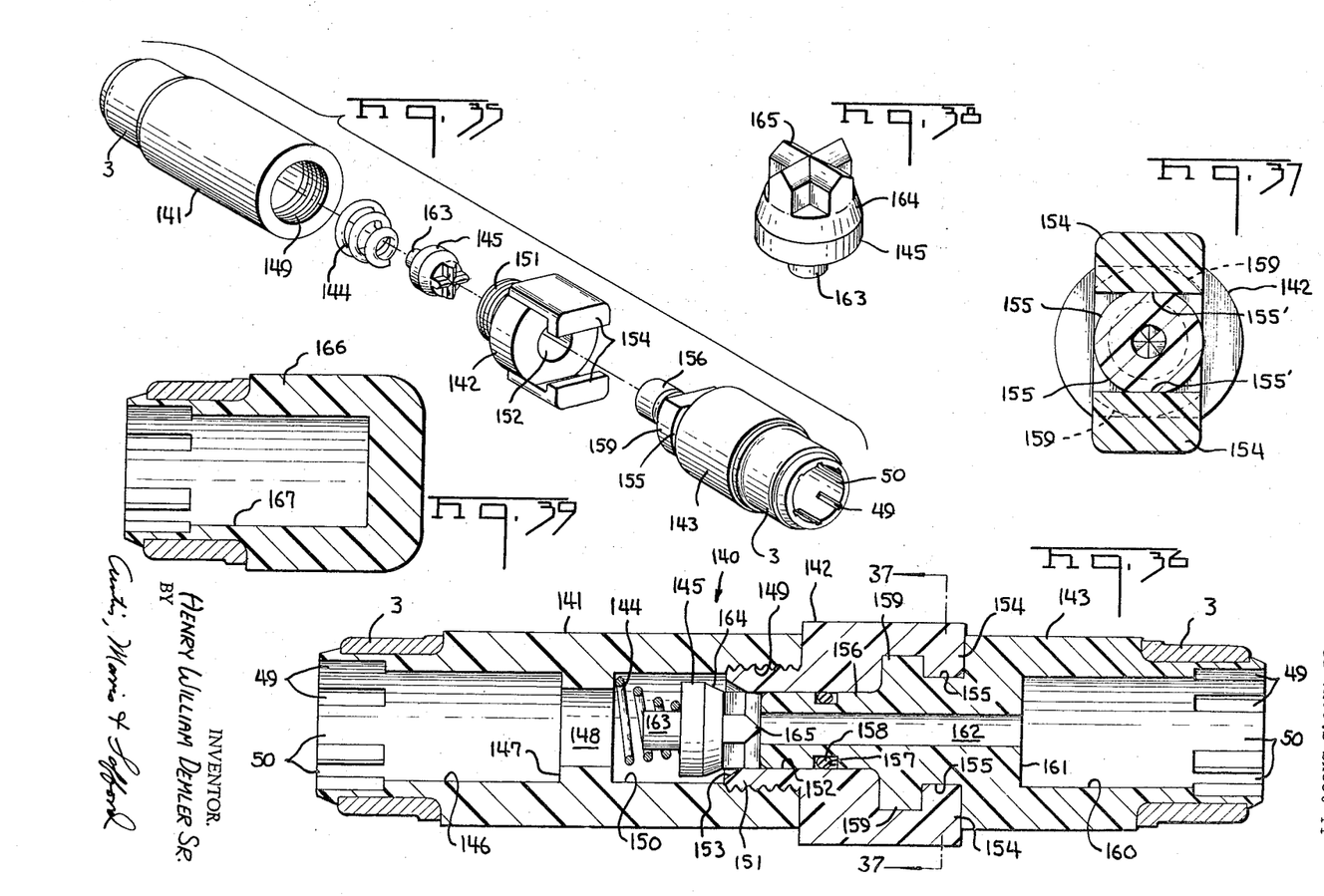
FIGURE 35 is an exploded perspective view of an in-line disconnect coupling member for tubular members.
FIGURE 36 is a cross-sectional view of the coupling member of FIGURE 35 in an assembled condition.
FIGURE 37 is a view taken along lines 37—37 of FIGURE 36.
FIGURE 38 is a perspective view of a sealing plunger of the coupling member.
FIGURE 39 is a cross-sectional view of a dead end.

Section 142 has a male threaded section 151 matable with threads 149. A bore 152 extends through section 142 and the end thereof at threaded section 151 has an annular beveled surface 153. Section 142 also includes L-shaped latching members 154 which extend outwardly therefrom in a direction opposite to threaded section 151.

Arcuate grooves 155 are disposed in section 143. The section in which arcuate grooves 155 are located is substantially round except that flat surfaces 155' are disposed in these arcuate grooves as illustrated in FIGURE 37. An extension 156 extends outwardly from one end of section 143 and is matable with bore 152. An annular groove 157 is disposed in extension 156 and an O-ring 158 is located in annular groove 157 in order to provide a sealing arrangement between extension 156 and bore 152. Arcuate projections 159 extend outwardly from extension 156 and the sides of these projections are flat so that they can clear the short legs of latching members 154 upon extension 156 being disposed in bore 152 until projections 159 abut against the flat surface of section 142 whereupon section 143 is rotated relative to section 142 until projections 159 are located behind the short legs of latching members 154 and flat surfaces 155' are engaged by the free ends of latching members 154 in order to latch members 142 and 143 together. With the free ends of the latching members disposed tightly against flat surfaces 155', this prevents sections 141 and 143 from being moved relative to each other unless they are forcefully moved relative to one another. Bore 160 has a continuous surface which extends inwardly from the non-continuous surface to an annular shoulder 161. Bore 162 extends through extension 156 and is in communication with bore 160.

Sealing plunger 145 is movably disposed within bore 150 and includes a round projection 163 disposed within the smaller end of coil spring 144, the larger end of coil spring 144 is disposed against annular shoulder 147. Spring 144 therefore presses plunger 145 toward section 142. A tapered surface 164 is located on plunger 145 and is matable with beveled surface 153 in a sealing manner when the surfaces are in engagement. A cross-shaped projection 165 extends outwardly from tapered surface 164 and the outer sections of the legs of cross-shaped projection 165 are tapered to a point. Cross-shaped projection 165 extends into bore 152 of section 142 and allows the fluid to pass therearound when tapered surface 164 is unseated from beveled surface 152 via extension 156 upon section 143 being latched to section 142 as illustrated in FIGURE 36. Section 141 therefore is normally crimped onto an end of a tubular member connected to a source of fluid supply and section 143 is crimped onto a tubular member connected downstream of the source of fluid supply. Thus, upon section 143 being disconnected from section 142, the source of fluid supply is automatically cut off due to spring 144 moving tapered surface 164 into sealing engagement with beveled surface 153 thereby providing a unique in-line disconnect coupling member which is readily crimped onto tubular members.

FIGURE 39 illustrates a dead end 166 which is really one-half of section 141 from the end of annular shoulder 147 to the end containing ferrule member 3. Dead end 166 includues a continuous blind bore 167 from the outer noncontinuous area including depressions 49 and splines 50 like FIGURE 18. No further explanation of dead end 166 is deemed to be necessary except that it is readily applied to an end of a tubing member in order to seal and terminate the end thereof.

It will, therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. A device for being secured to an end of a tubular conduit member comprising a member of organic plastic having a tubular portion provided with an interior wall, said interior wall having a first section and a second section, said first section having a continuous surface corresponding to the configuration of said conduit member for providing an effective fluid-tight seal with said conduit member, said second section being closed circumferentially and having a noncontinuous area, said area having a plurality of surfaces extending substantially parallel with a longitudinal axis of said member, ferrule means disposable on an exterior surface of said member overlying said first and second sections, said ferrule means being reduceable in diameter upon radial pressure being applied thereto when said end of said conduit member is disposed within said portion to cause said member to sealingly engage said conduit member and deform said conduit member generally in accordance with the configuration of said noncontinuous area.

2. A device according to claim 1 wherein said plurality of surfaces are flat surfaces.

3. A device according to claim 1 wherein said noncontinuous area includes splines.

4. A device according to claim 1 wherein said plurality of surfaces define an undulated configuration.

5. A device according to claim 1 wherein said plurality of surfaces define a serrated configuration.

6. A device according to claim 1 wherein said plurality of surfaces define an octagonal configuration.

7. A device according to claim 1 wherein said noncontinuous area includes equally-spaced splines.

8. A device according to claim 1 wherein said noncontinuous area includes equally-spaced splines which deform the conduit member in the shape of a hexagon.

9. A device according to claim 1 wherein locating means are disposed on said exterior surface to position said ferrule means relative to said member.

10. A device according to claim 1 wherein said continuous surface has a length at least equal to the length of said noncontinuous area.

11. A device according to claim 1 wherein said second section extends inwardly to about half the area covered by said ferrule means.

12. A device according to claim 1 wherein said device includes a tubular conduit member and an element having an opening extending therethrough disposed on said conduit member, a section extending outwardly from said element opening matable with a flange on said conduit member, said element being limited in axial movement along said conduit member by an end of said plastic member and said flange, sealing means between said element opening and said conduit member to form a seal therebetween, and thread means on said element.

13. A device for being secured on an end of a tubular conduit member comprising a member of yieldable material having a tubular portion provided with an interior wall having a first section and a second section, said first section having a circumferentially continuous surface corresponding to the configuration of said conduit member for providing an effective fluid-tight seal with said conduit member, said second section being closed circumferentially and defining a noncontinuous area of circumferentially alternating first portions and second portions and having a predetermined axial length, said first portions and said continuous surface being substantially equally disposed closer to a longitudinal axis of said member than said second portions, ferrule means at the exterior of said member overlying said first and second sections, said ferrule means being reduceable in diameter upon radial pressure being applied thereto when said end of said conduit member is disposed within said portion to cause said member to sealingly engage said conduit member and deform said conduit member, generally in accordance with the configuration of said noncontinuous area whereby the conduit member is prevented from relative rotary movement with respect to said tubular portion.

14. A coupling device for joining together tubular conduit members comprising a member of a material having the physical properties of organic plastic, said member having an opening extending therethrough, said opening from each end inwardly being provided with a first section and a second section, said first section having a continuous surface corresponding to the configuration of said conduit members for providing an effective fluid-tight seal with said conduit members, said second section being closed circumferentially and having a noncontinuous area, said area having a plurality of surfaces extending substantially parallel with a longitudinal axis of said member, ferrule means disposable on an exterior surface of said member overlying said first and second sections, said ferrule means being reduceable in diameter upon radial pressure being applied thereto when ends of said conduit members are disposed within said opening to cause said member to sealingly engage said conduit members and deform said conduit members generally in accordance with the configuration of said noncontinuous area.

15. A device for being secured on an end of a tubular conduit member comprising a reducer member of organic plastic having a tubular portion provided with an interior wall, said interior wall having a first section and a second section, said first section having a continuous surface corresponding to the configuration of said conduit member for providing an effective fluid-tight seal with said conduit member, said second section being closed circumferentially and having a noncontinuous area, said area having a plurality of surfaces extending substantially parallel with a longitudinal axis of said member, an outer tubular element of yieldable material, said reducer member being disposed in the bore of the tubular element, ferrule means disposable on an exterior surface of said element and overlying said first and second sections, said ferrule means being reducable in diameter upon radial pressure being applied thereto when said end of said conduit member is disposed within said portion to cause said reducer member to sealingly engage said conduit member and deform said conduit member generally in accordance with the configuration of said noncontinuous area.

References Cited

UNITED STATES PATENTS

| | | | |
|---|---|---|---|
| 1,678,640 | 7/1928 | Hall | 285—256 X |
| 1,944,890 | 1/1934 | Heidloff | 285—256 X |
| 1,962,060 | 6/1934 | Emery | 285—256 X |
| 2,211,147 | 8/1940 | Miller | 285—256 X |
| 2,477,677 | 8/1949 | Woodling | 285—354 X |
| 2,481,001 | 9/1949 | Burckle | 285—256 X |
| 2,786,095 | 3/1957 | Arbeiter | 174—88.2 |
| 2,798,113 | 7/1959 | Koller et al. | 174—88.2 |
| 2,981,787 | 4/1961 | Brautigam et al. | 174—84.1 |
| 3,015,684 | 1/1962 | Schneider | 174—84.1 |
| 3,109,052 | 10/1963 | Dumire et al. | 174—88.2 |

FOREIGN PATENTS

| | | |
|---|---|---|
| 1,207,150 | 8/1959 | France. |

CARL W. TOMLIN, *Primary Examiner.*

THOMAS F. CALLAGHAN, *Examiner.*